United States Patent [19]
Kawasaki

[11] 3,801,929
[45] Apr. 2, 1974

[54] GAS LASER APPARATUS HAVING LOW TEMPERATURE SENSITIVITY
[75] Inventor: Harumi Kawasaki, Tokyo, Japan
[73] Assignee: Asahi Kogaku Kogyo Kabushiki Kaisha, Tokyo, Japan
[22] Filed: July 31, 1972
[21] Appl. No.: 276,668

[52] U.S. Cl. ............................................. 331/94.5
[51] Int. Cl. ............................................. H01s 3/10
[58] Field of Search ..................... 331/94.5; 330/4.3

[56] References Cited
UNITED STATES PATENTS
3,668,547  6/1972   Bodlaj ............................... 331/94.5
3,496,488  2/1970   Fork et al. ......................... 331/94.5
3,611,183  10/1971  Fendley, Jr. ....................... 331/94.5
3,388,314  6/1968   Gould ................................ 331/94.5

Primary Examiner—William L. Sikes
Attorney, Agent, or Firm—Christie, Parker & Hale

[57] ABSTRACT

A gas laser including a cylindrical-shaped enclosure housing that is made of a low thermal expansion coefficient material. A laser discharge tube has positive and negative spaced apart electrodes at opposite ends. A pair of resonator mirrors are positioned one at either end of the laser discharge tube in the path of a laser beam passing out of the discharge tube. A piezoelectric device is operably connected to one of the mirrors for adjusting the position of such mirror relative to the other mirror. The resonator mirrors, the crystal, and the laser discharge tube are mounted substantially symmetrically about the central axis of the cylindrical-shaped enclosure housing.

10 Claims, 6 Drawing Figures

GAS LASER APPARATUS HAVING LOW TEMPERATURE SENSITIVITY

BACKGROUND OF THE INVENTION

The present invention relates to the construction of a laser resonator which is highly suited for stabilizing the oscillation wavelength or oscillation frequency of a gas laser.

Several methods have been proposed for stabilizing the wavelength, chiefly in a helium-neon gas laser, and one or more of these methods are actually put to practical use. To realize a laser apparatus of such a type as having a stabilized oscillation wavelength or frequency, considerations must be given to the construction of resonator. More specifically, the length of the laser resonator must always be maintained constant with variation in the ambient temperature and the mechanical vibration, and a pair of resonator reflecting mirrors must be held parallel to each other. Regarding the laser oscillation modes in this type of apparatus, both the horizontal and vertical modes must be single ($TEM_{001}$) (TEM being transverse electro-magnetic), and under such a condition where the oscillation frequency is stabilized, the oscillation spectrum must always be maintained at the true center of Doppler width which is known as Lamb dip. Since a gas laser apparatus is substantially constructed as a Fabry-perot type resonator which is readily affected by the mechanical vibration or thermal expansion, special consideration must be given to the resonator in connection with the structural material, mechanical design, and temperature adjustment. In view of these points, a pair of laser resonator mirrors are securely held at each end of a cylinder made of a material with a low thermal expansion coefficient such as, for example, invar, and the whole resonator is dipped in a thermostatic tank which is so designed that the temperature within the tank can be adjusted. With this method, a frequency stability in the order of $5 \times 10^{-7}$/day may be assured. It has been found, however, that such a method is not always satisfactory in an actual stabilized gas laser apparatus for the following reasons.

The first reason is that the laser tube cannot be maintained at a constant temperature even when it is dipped in the thermostatic tank because the laser tube has an asymmetrical structure, in which a considerably large cathode tube is attached externally to a glass tube forming a discharge portion, and a cathode being usually employed is a hot cathode which forms an asymmetrical heat source. The second reason is that no appropriate method can be found for securely holding the thin laser tube. In order to maintain a single mode, the laser tube must be held in such a manner, unlike in an ordinary laser apparatus of multiple mode type, that it cannot be moved radially but is expandible along the optical axis thereof due to the thermal expansion. The third reason is that the mechanism for holding a pair of resonator mirrors cannot be made as a perfectly symmetrical cylinder but is made generally into a more complicated mechanism due to the asymmetricalness in the construction of the laser tube. Because the conventional laser apparatus of this type has been a so-called external mirror type, wherein a pair of mirror holders are fixed along the extension of the optical axis of the laser discharge tube having a Brewster window on each end thereof, each of the holders includes a mechanism for optically adjusting the resonator mirrors. The fourth reason is that it is not an easy task to stabilize the laser oscillation frequency by achieving a relative mechanical stability between the laser discharge tube and its holder means, between the resonator spacer and the resonator mirror holders, and between the laser discharge tube and the resonator mirrors, and that it is difficult to minimize the possible relative displacement between various components due to the external expansion and the vibration.

SUMMARY OF THE INVENTION

By employing a relatively simple mechanism having a symmetrical configuration, the present invention overcomes the aforementioned difficulties and provides an inexpensive stabilized laser apparatus. Furthermore, the laser resonator is made of a material having a low thermal expansion coefficient, therefore an extremely rough temperature control within the thermostatic tank may work sufficiently and the thermal saturation time (preheating time) can be reduced because of the nearly perfectly symmetrical configuration of the mechanism. Also it is possible to improve the stability and the reproducibility (or accuracy in repetition) of the laser oscillation frequency and the output power.

DETAILED DESCRIPTION OF THE INVENTION

Figure 1:
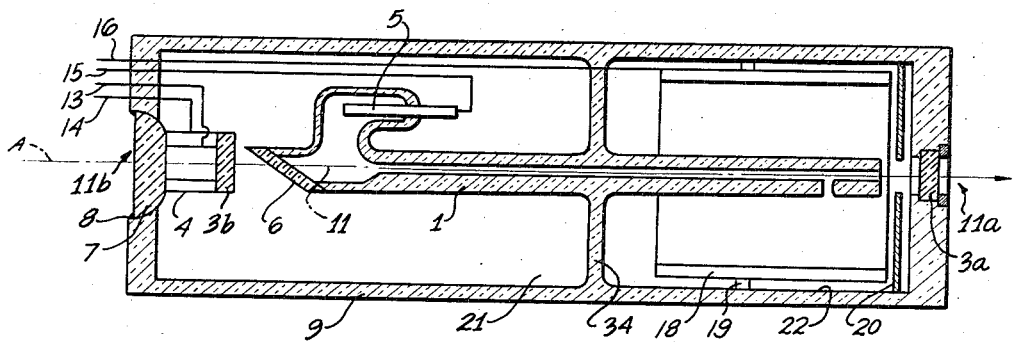
FIG. 1 is a longitudinal sectional view of the principal portion of the apparatus according to one embodiment of the invention.

In FIG. 1, a cylinder 9 is made of a material having a very low thermal expansion coefficient (oc) such as, for example, neoceram, (where $\alpha = 1 \times 10^{-7}/C°$) or fused quartz. The cylinder 9 serves as a spacer means for holding resonator mirrors 3a and 3b as an external holder for a laser tube 1, and also as a reservoir 21 for the mixture of helium and neon. The laser discharge tube 1 is opened at the end near the mirror 3a but has a Brewster window 6 at the end near the mirror 3b. Taking the length of the resonator (for example, 120mm), the curvature and reflection factor of the resonator mirrors into consideration, the configuration, the effective discharge length (for example, 80mm) and the inner diameter (for example, 1mm) of the laser discharge tube 1 are determined so that the laser discharge tube 1 can make a $TEM_{ooq}$ oscillation. The laser discharge tube 1 is held on the central axis A of the spacer 9 by means of an isolating glass plate 34.

An anode is represented by a numeral 5. A cylindrical cold cathode 18 is made of aluminum which has been subjected to a positive electrode oxidation process, and is held within the spacer 9 coaxially with the optical axis 11a of the spacer 9 by means of a retainer means 19. A shield plate 20 serves to prevent the discharged electrons from reaching the mirror 3a.

Another method for making such a cold cathode 18 is to carry out a vaporization process for depositing an aluminum layer on the inner surface 22 of the spacer 9. In this method, the portion which should be processed to make a cathode and the area of the portion may be determined such that the discharged electrons can effectively reach the anode 5 through the internal space of the laser discharge tube 1.

A first feature of one embodiment the present invention lies in such a cold cathode 18. Almost all the conventional cathodes for use in the laser apparatuses of this type are hot cathodes, each having such a structure that the cathode is extended outwardly from the spacer. This structure is necessarily accompanied by the above-referred first and third disadvantages. With a conventional hot cathode, there is involved a heat generation from the filament (approximately 15 W) together with the heat generation from the laser discharge tube (not more than several W), which disturbs the temperature control for the laser apparatus.

A second feature of one embodiment of the invention is that the mirrors 3a and 3b are adhered to the cylinder 9 to make a laser apparatus of internal mirror type which requires no optical adjusting mechanism for laser oscillation. The mirror 3a is vacuum-bonded in line with the central axis of the laser discharge tube 1. The mirror 3b is bonded to a piezo-electric device 4, which in turn is bonded to a window glass 7 to form an integral assembly which is mounted to the spacer 19 as shown in FIG. 1. In order to adjust the laser oscillation, the leads 15 and 16 from the cathode 18 and anode 5 are connected to the laser power source for discharging the laser discharge tube 1.

While making observation at the side 11b of the optical axis, the window glass 7 integrally assembled with the mirror 3b is adjusted by slanting it over a slight angle and then a vacuum adhesive is applied to the optical contact surface 8 between the window glass 7 and the cylinder 9. Thus the window glass 7 and the cylinder 9 are bonded together after a laser oscillation. Once such an adjustment has been completed, the mirrors 3a and 3b require no further adjustment.

Such a technique is already known, and a laser apparatus of internal mirror type is available in the market. However, a feature of the present invention lies in the structure, wherein the piezo-electric device 4 is bonded with the mirror 3b and controlled by such an appropriate method as described hereinafter for stabilizing the laser wavelength.

Figure 2:
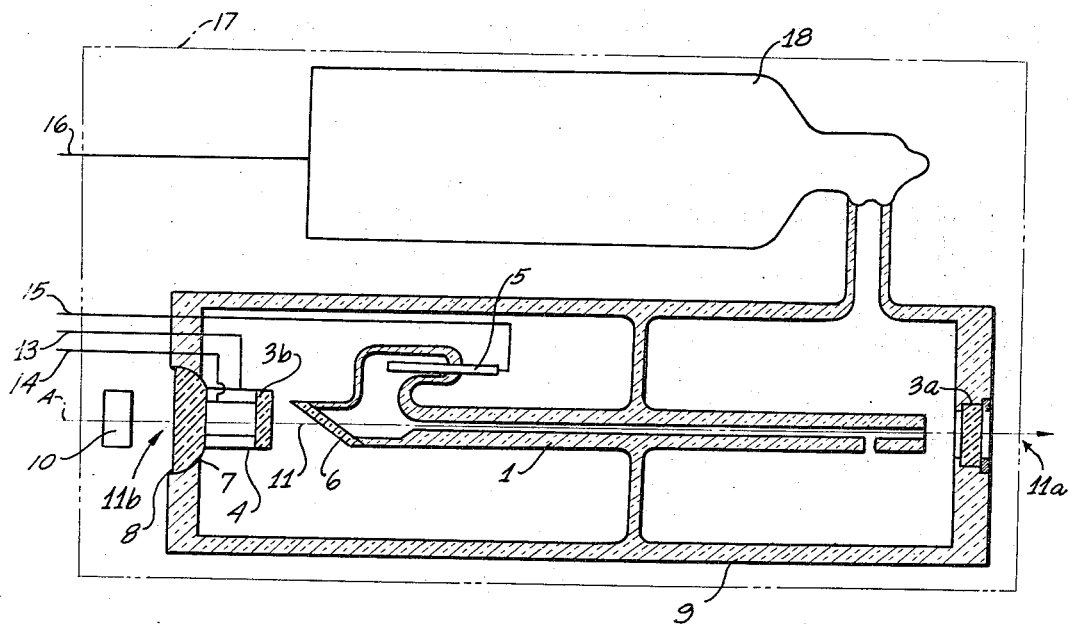
FIGS. 2 and 3 are similar views to FIG. 1, each representing the principal portion of an alternate embodiment of the invention.

The internal mirror type of laser apparatus shown in FIG. 2 is quite similar to that shown in FIG. 1 except that the cold cathode 18 is extended into a thermostatic tank 17. With this construction, unlike the structure shown in FIG. 1, the laser tube 1 loses its symmetrical configuration so that the application of this construction is limited only to such a case where it is difficult to produce such a cold cathode 18 as shown in FIG. 1.

Figure 3:
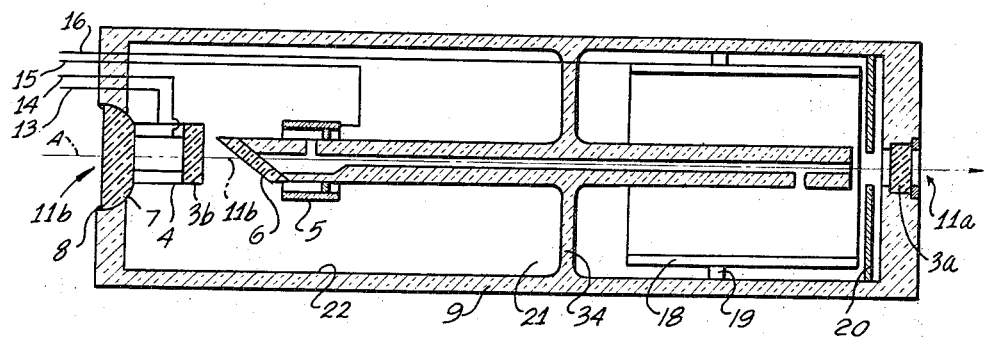

According to the embodiment shown in FIG. 3, the anode 5 is made of a hollow cylindrical material which is arranged coaxially with the optical axis 11 in the same manner as the cold cathode 18 of the embodiment shown in FIG. 1. With such an arrangement, all the members that serve directly for the laser radiation can be formed to have a symmetrical configuration with respect to the optical axis, so that most effective operation can be made. Furthermore, a spacer 9 having a reduced diameter or having an inner wall portion which is protruded radially inwardly may be used to provide a controlled spacing between the discharge tube 1 and the inner wall surface of the spacer 9 on which an electrode material is coated by spattering.

Figure 4:
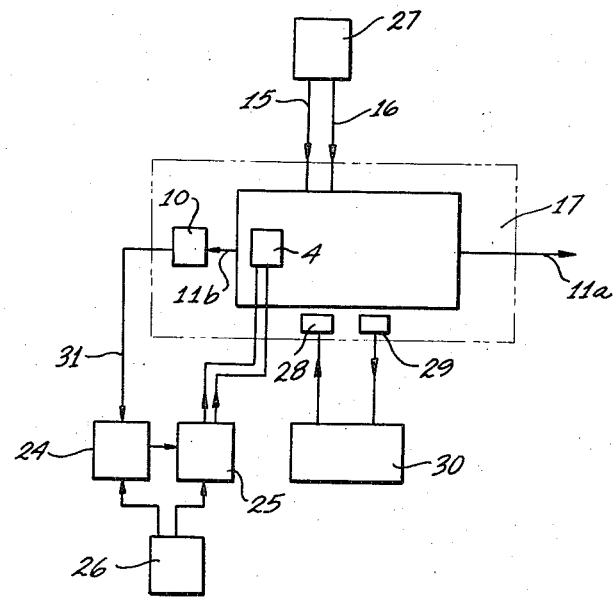
FIG. 4 is a block diagram of a circuit for stabilizing the laser oscillation frequency according to one embodiment of the invention.

FIG. 4 shows a way of stabilizing the laser oscillation frequency with use of one of the shown laser tubes. Generally, there are two different ways to stabilize the laser oscillation frequency. The first is to control the temperature by dipping the whole laser tube in a thermostatic tank; the second is to servocontrol one of the resonator mirrors by use of a piezo-electric device. Each of these methods intends to center the laser oscillation frequency about the central point D of the depression (Lamb dip) in the oscillation waveform shown in FIG. 6. Generally speaking, about $5 \times 10^{-7}$/day of stability can be realized in the laser wavelength with only the first method, but in such a case, only a much limited reproducibility can be achieved in the oscillated wavelength. By employing the first and second methods in combination, such a high accuracy as less than $5 \times 10^{-7}$/day can be realized after a long term operation and the center of the wavelength is continuously maintained at point D.

Figure 6:
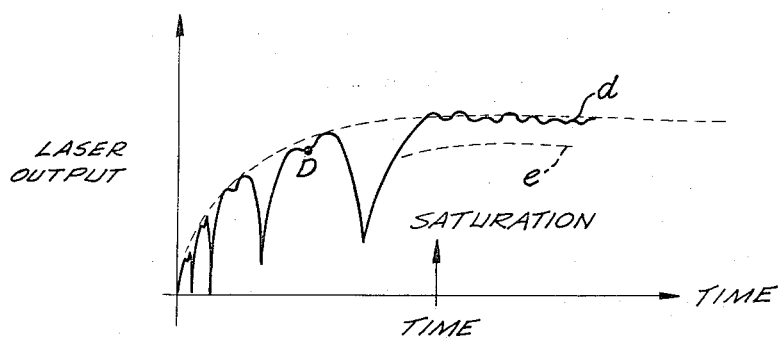
FIG. 6 is a graph showing a characteristic curve of an apparatus according to the present invention.

The characteristic curve shown in FIG. 6 represents the variation in the output from the laser apparatus after its being fired. With only the first method, the laser output will change in such a manner as shown by the dotted lines d and e after the resonator length attains a thermally saturated condition so that the oscillation frequency cannot necessarily be centered about the point D (the center of the oscillation spectrum from a Ne atom).

Referring to FIG. 4, in order to control temperature employing the first method, a thermostatic tank 17 encasing the laser is used together with a heater 28 and a thermister (temperature detector) 29. The temperature within the thermostatic tank 17 is maintained at a constant value by means of a temperature controlling circuit 30. In a conventional laser apparatus employing a hot cathode, it was difficult to achieve the temperature control because; 1 the laser tube structure is asymmetrical; and 2 the heat generation from the cathode is larger than from the discharge tube. A conventional control circuit for attaining a setting temperature of 58°C and control accuracy of ± 0.1°C has been relatively complex in construction.

The laser apparatus according to the present invention employs a cold cathode and a symmetrical spacer made of a material having a low thermal expansion coefficient. As a result, it can be expected that the temperature control circuit can be simplified, the warm-up time of the laser apparatus (the time elapsed before the laser wavelength being stabilized) can be reduced, and the thermal deformation and the thermal hysterisis T (reproducibility in the laser output curve when the laser apparatus is turned on and off repeatedly) can be minimized.

Referring again to FIG. 4, on the optical axis 11b of the laser apparatus and immediately behind the window glass 7 is located a photoelectric detecting device 10 which transfers the laser output to a servo-amplifier. An oscillator 26 supplies an alternating current to a power supply 25 for the electric distortion element to thereby make a fast scanning adjustment of the piezoelectric device 4. At the same time the oscillator 26 also supplies a carrier wave to the phase detector included in the servo-amplifier 24. The output error voltage from the servo-amplifier 24 controls a direct current component from the power supply 25 which is employed to control the piezoelectric device 4, and determines the amount of adjustment provided by the piezoelectric device 4 to the mirror 36 so that the laser output always follows the center point in the oscillation waveform (point D in FIG. 6). In this manner, the oscillation wavelength is stabilized on the laser output side 11a along the optical axis of the laser apparatus.

Figure 5:
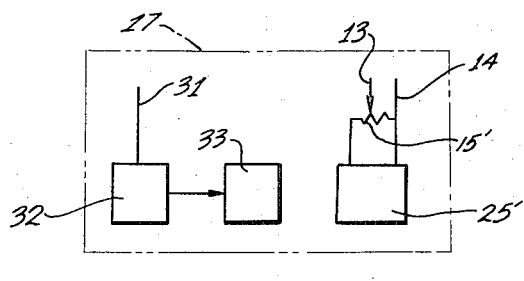
FIG. 5 is a block diagram of a circuit for stabilizing the laser oscillation frequency of an alternate embodiment of the invention.

Although not essential to the present invention, another stabilizing method may be devised (FIG. 5). According to this method, such a thermostatic tank 17 and temperature control system 28, 29, and 30 as shown in FIG. 4 are used without any modification, and the operation for setting the wavelength to the center of the oscillation wavelength (point D) is made manually without making a servo-control for the mirror 3b by means of piezo-electric device 4. The laser light detecting voltage 31 from a photocell 10 is transferred by way of direct current amplifier 32 to a power monitor 33 (ammeter) for indication. A DC voltage from a power supply 25' is applied through lines 13, 14 to the piezo-electric device 4; the DC voltage has a sufficiently high level to adjust the piezoelectric device 4 and can be varied by means of an accurate potentiometer 15'. The operator of the laser apparatus can set the laser output to the center of the laser oscillation by adjusting the accurate potentiometer 15' while visually observing the power monitor 33. After the laser apparatus having attained a sufficiently constant temperature condition (for example, at an hour after the laser apparatus has been started), one such a wavelength setting has been made, no further setting will be required. Especially with the laser apparatus according to the present invention, the latter method will be more effective, because the preheating time will be extremely reduced and the resonator will present only a small expansion due to the above-referred reasons.

It will be understood that the laser apparatus according to the present invention offers remarkable advantages over the conventional apparatuses of similar types. According to an embodiment of the present invention; 1 all the components of the laser apparatus are encased in a thermostatic tank so that the laser apparatus can always operate under a stabilized condition, and also the components are made into perfectly symmetrical forms with respect to the optical axis and sealed in a small-sized cylinder, and; 2 the spacer accommodated in the laser apparatus is made of a material having a low thermal expansion coefficient, so that several practical advantages may be enumerated as follows:

I. The laser apparatus according to the present invention has a symmetrical structure with sufficient mechanical rigidity. Being compact and portable, the less expensive laser apparatus of the invention is advantageous for industrial use.

II. Due to the symmetrical structure and the types of the structural materials used, the preheating time can be reduced, the vibration resistivity can be increased, and the effects from the atmospheric disturbance can be neglected (due to the employment of the internal mirror system), so that the laser apparatus of the invention has an exceedingly high reliability in stabilizing the wavelength.

Although the laser apparatus of the invention has been described in detail in a form of helium-neon gas laser apparatus, the present invention may also be applied to the laser oscillation apparatus utilizing the other active media than the mixture of helium and neon, and may be applied over a wide range of wavelength, including visible rays and infrared rays.

What is claimed is:

1. A gas laser apparatus comprising:
   a sealed cylindrical-shaped enclosure housing comprising a material of low thermal expansion coefficient having a central axis;
   a laser discharge tube for passing a laser beam along said axis and having positive and negative spaced apart electrodes, said electrodes being positioned at opposite ends of said tube and both being constructed symmetrical about said central axis;
   a pair of resonator mirrors, one positioned at each end of said laser discharge tube in the path of said laser beam;
   a piezoelectric crystal operably connected to one of said mirrors for adjusting the position of such mirror relative to the other longitudinally along said axis; and
   means symmetrically extending around said central axis for mounting the resonator mirrors, the crystal and the laser discharge tube substantially symmetrically about the central axis on the inside of said cylindrical-shaped enclosure.

2. Apparatus according to claim 1 comprising means for maintaining the temperature of said gas laser apparatus substantially constant.

3. Apparatus according to claim 2 wherein said gas laser apparatus is encased in a thermostatic tank.

4. Apparatus according to claim 1 comprising means for detecting the laser beam and for forming a corresponding electrical signal, means for comparing the electrical signal against a reference signal and for providing an output signal indicative of the difference and means responsive to the output signal for energizing said crystal to thereby maintain the laser oscillation frequency substantially constant for variations in temperature.

5. Apparatus according to claim 1 comprising an optical aperture at each end of said enclosure housing along said central axis through which said laser beam may pass.

6. A gas laser according to claim 1 wherein said housing and said mounting means for said tube comprise a low thermal expansion glass material.

7. A gas laser apparatus comprising:
   a. a sealed cylindrical-shaped enclosure housing comprising a side and ends of a common low thermal expansion coefficient material;
   b. an elongated laser discharge tube having a central passage therein through which a laser beam may pass;
   c. means symmetrically extending around said central axis for mounting said elongated tube on the inside of said housing with the central passage symmetrically positioned about said central axis;
   d. a pair of resonator mirrors, one positioned at each end of said housing;

e. means for mounting each mirror on the respective end wall of said housing, symmetrical about said central axis;

f. anode and cathode electrodes spaced apart, one at each end of said discharge tube, each symmetrically constructed about said central axis for generating a laser beam along said central axis between said mirrors;

g. means symmetrically extending about said central axis for mounting said electrodes in said housing about said central axis; and h. said mirror mounting means comprising a piezoelectric crystal in between one end wall and one mirror for adjusting the position of such mirror relative to the other.

8. A gas laser according to claim 7 wherein the mounting means for said cathode electrode comprises a spacer symmetrically extending from said side wall of the housing to said cathode electrode.

9. A gas laser according to claim 7 wherein said anode mounting means is connected to said tube.

10. A gas laser according to claim 7 comprising a shield plate symmetrically constructed about said central axis and having an aperture along said central axis, said shield plate being positioned in between the cathode electrode and the mirror at the corresponding end of said housing.

* * * * *